United States Patent
Higuchi et al.

(10) Patent No.: US 8,210,040 B2
(45) Date of Patent: Jul. 3, 2012

(54) OSCILLATING ANGULAR SPEED SENSOR

(75) Inventors: Hirofumi Higuchi, Okazaki (JP); Akitoshi Yamanaka, Hekinan (JP); Tetsuo Fujii, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 307 days.

(21) Appl. No.: 12/722,707

(22) Filed: Mar. 12, 2010

(65) Prior Publication Data
US 2010/0229646 A1     Sep. 16, 2010

(30) Foreign Application Priority Data

Mar. 13, 2009   (JP) .................. 2009-61251

(51) Int. Cl.
*G01C 19/56* (2006.01)
*G01P 9/04* (2006.01)
*G01P 1/02* (2006.01)

(52) U.S. Cl. ............. 73/504.12; 73/504.14; 73/493
(58) Field of Classification Search ............ 73/504.12, 73/504.14, 504.16, 514.32, 493
See application file for complete search history.

(56) References Cited

U.S. PATENT DOCUMENTS

| | | | |
|---|---|---|---|
| 6,465,854 B1 | 10/2002 | Muenzel et al. | |
| 7,004,025 B2 | 2/2006 | Tamura | |
| 7,513,155 B2 * | 4/2009 | Jeong et al. | 73/504.02 |
| 2002/0033047 A1 | 3/2002 | Oguchi et al. | |
| 2005/0227401 A1 | 10/2005 | Lee et al. | |
| 2007/0272015 A1 | 11/2007 | Kazama et al. | |
| 2008/0081150 A1 | 4/2008 | Arao et al. | |
| 2008/0115579 A1 * | 5/2008 | Seeger et al. | 73/504.12 |

FOREIGN PATENT DOCUMENTS

| | | |
|---|---|---|
| JP | A-H11-51656 | 2/1999 |
| JP | A-2002-22446 | 1/2002 |
| JP | A-2005-297180 | 10/2005 |
| JP | A-2007-315830 | 12/2007 |

OTHER PUBLICATIONS

Office Action dated Mar. 15, 2011 issued from the Japan Patent Office for corresponding Japanese patent application No. 2009-061251 (English translation enclosed).

* cited by examiner

*Primary Examiner* — Helen C. Kwok
(74) *Attorney, Agent, or Firm* — Posz Law Group, PLC

(57) ABSTRACT

An oscillating angular speed sensor includes a detector, a driving portion, and a separating portion. When an angular speed is generated while the detector is driven to oscillate by the driving portion, Coriolis force is applied to the detector. Therefore, the angular speed is detected based on a capacitance variation in accordance with a variation of an interval between a movable electrode and a fixed electrode of the detector. The separating portion is distanced from the detector and the driving portion, and is configured to separate a first space accommodating the detector and a second space accommodating the driving portion.

10 Claims, 5 Drawing Sheets

OSCILLATING ANGULAR SPEED SENSOR

CROSS REFERENCE TO RELATED APPLICATION

This application is based on Japanese Patent Application No. 2009-61251 filed on Mar. 13, 2009, the disclosure of which is incorporated herein by reference in its entirety.

BACKGROUND OF THE INVENTION

1. Field of the Invention

The present invention relates to an oscillating angular speed sensor.

2. Description of Related Art

JP-A-2002-500961 discloses a micro mechanical component produced by connecting a substrate wafer and a cap wafer. The substrate wafer has a surface structure to detect a physical quantity. The cap wafer has a recess opposing to the surface structure of the substrate wafer, such that the surface structure can be prevented from having a contact from outside. The cap wafer is bonded to the substrate wafer, and the surface structure is sealed in a space between the wafers.

The space between the wafers is a single closed space, such that the surface structure is arranged in the single space. When the surface structure operates as an oscillating angular speed sensor, the sensor includes a detector to detect an angular speed, and a driving portion to drive the detector in a single direction. In this case, the detector and the driving portion are arranged in the same single space.

However, in a case that gas is filled in the space, when the driving portion drives the detector, oscillation amplitude of the detector may be affected by a damping of the gas. Therefore, it is difficult for the driving portion to drive the detector in the single direction, such that a detection accuracy of the sensor may become worse. Thus, the space may be required to be vacuumed for the driving portion, so as to secure the oscillation amplitude of the detector. However, when the space is vacuumed, the gas cannot have an effect of the damping. Therefore, electrodes of the detector may have damage due to collision or sticking, when an impact is applied to the sensor.

That is, a space suitable for the detector, and a space suitable for the driving portion are different from each other.

SUMMARY OF THE INVENTION

In view of the foregoing and other problems, it is an object of the present invention to provide an oscillating angular speed sensor.

According to an example of the present invention, an oscillating angular speed sensor includes a detector, a driving portion, and a separating portion. The detector is arranged on a face of a substrate, and includes a detecting movable electrode arranged to oppose to a detecting fixed electrode. The detecting fixed electrode is supported by a part of the substrate. The detecting movable electrode is movable relative to the detecting fixed electrode. The driving portion is arranged on the face of the substrate, and includes a driving movable electrode to drive the detector to oscillate in a drive direction approximately perpendicular to a movable direction of the detecting movable electrode. The separating portion is fixed on the face of the substrate so as to be distanced from the detector and the driving portion. The detecting movable electrode is displaced by Coriolis force applied to the detector, when an angular speed is generated while the detector is oscillated, such that the angular speed is detected based on a capacitance variation generated in accordance with a variation of an interval between the detecting movable electrode and the detecting fixed electrode. The separating portion is configured to separate a first space accommodating the detector and a second space accommodating the driving portion.

Accordingly, detection accuracy of the angular speed sensor can be raised.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

First Embodiment

An oscillating angular speed sensor detects an angular speed as a physical quantity. For example, the sensor is used for detecting an angular speed of a vehicle.

Figure 1:
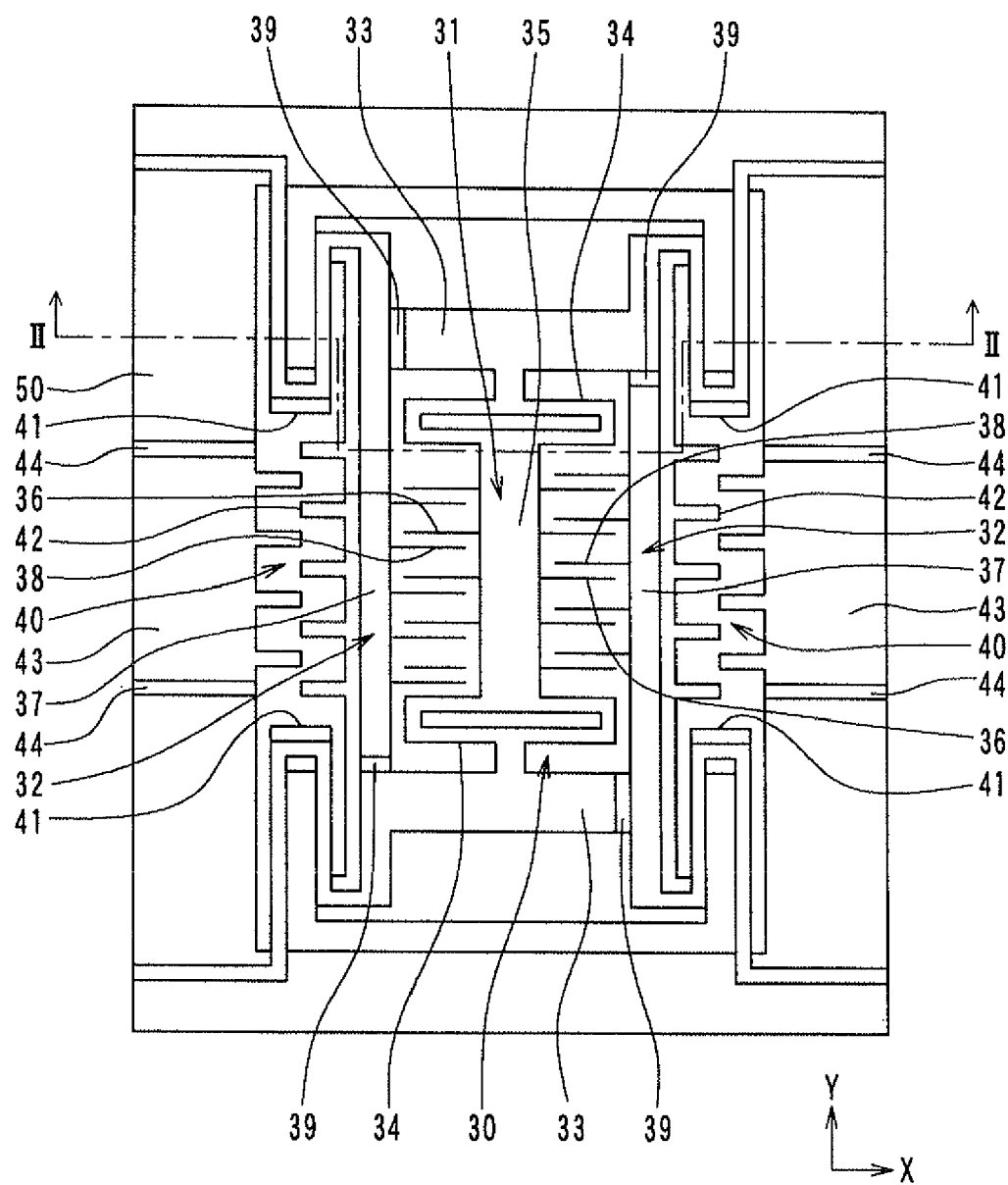
FIG. 1 is a schematic plan view illustrating an oscillating angular speed sensor according to a first embodiment.

The sensor will be described with reference to FIGS. 1 and 2.

Figure 2:
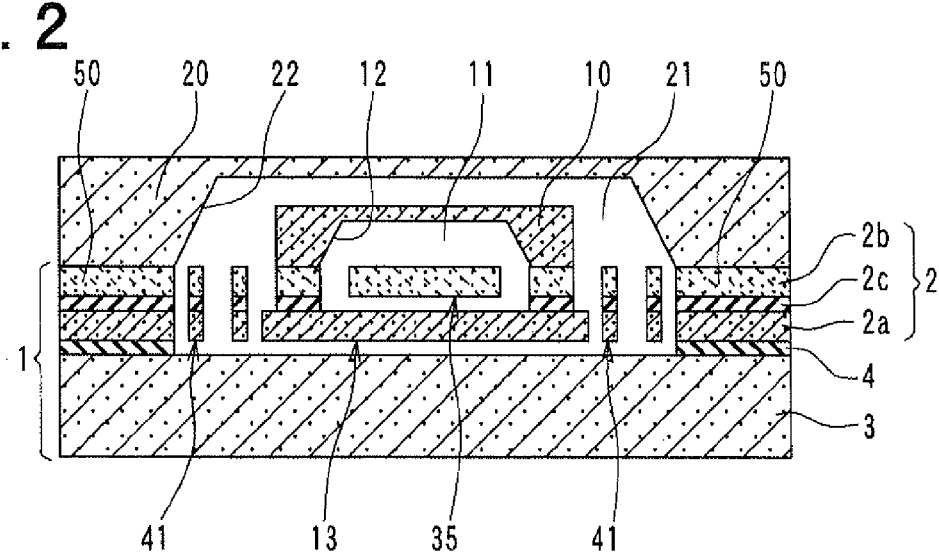
FIG. 2 is a schematic cross-sectional view taken along line II-II of FIG. 1.

As shown in FIG. 2, the sensor includes a board-shaped substrate 1, and first and second board-shaped caps 10, 20 fixed on a face of the substrate 1.

The substrate 1 has a three-layer construction, in which an insulation layer 4 is arranged between a first board 2 and a second board 3. The second board 3 is made of silicon, and the insulation layer 4 is made of $SiO_2$, for example.

The first board 2 is configured to detect an angular speed. Specifically, the first board 2 is defined by arranging a sacrifice layer 2c between a support board 2a and a semiconductor layer 2b. That is, the first board 2 corresponds to a silicon on insulator (SOI) substrate. The face of the substrate 1 corresponds to a face of the first board 2 opposite from the insulation layer 4. That is, the face of the substrate 1 corresponds to a face of the semiconductor layer 2b opposite from the sacrifice layer 2c.

The support board 2a is made of single crystal silicon having a thickness of 450-600 μm, for example. The semiconductor layer 2b is made of poly-silicon having a thickness of 15-30 μm, for example. The sacrifice layer 2c is made of SiO$_2$ having a thickness of several μm, for example.

A detector 30, a driving portion 40, and a periphery portion 50 are defined in the semiconductor layer 2b. The detector 30 detects Coriolis force generated in accordance with an angular speed, and includes a movable part 31, a fixed part 32, and a wiring 33.

The movable part 31 has a beam 34, a weight 35 and a movable electrode 36.

The wiring 33 supports the beam 34, the weight 35 and the movable electrode 36 in a float state relative to the support board 2a. The wiring 33 is fixed on the sacrifice layer 2c.

The beam 34 connects the wiring 33 and the weight 35, and has a spring property. The weight 35 is integrally supported by the wiring 33, due to the beam 34. Therefore, the beam 34, the weight 35 and the movable electrode 36 are floated above the support board 2a with a predetermined interval.

When an angular speed is applied to the sensor, the weight 35 receives Coriolis force and displaces the movable electrode 36 relative to the wiring 33. The weight 35 has an approximately rectangular shape. The movable electrode 36 extends in a direction approximately perpendicular to a longitudinal direction of the weight 35. That is, as shown in FIG. 1, the movable electrode 36 extends in an X-axis direction perpendicular to a Y-axis direction. A plurality of the movable electrodes 36 is arranged in a comb-teeth shape.

The fixed part 32 includes a wiring 37 and a fixed electrode 38. The wiring 37 electrically connects the fixed electrode 38 and outside. The wiring 37 is fixed on the sacrifice layer 2c, and supports the fixed electrode 38 relative to the support board 2a.

The fixed electrode 38 corresponds to a beam having a rectangular cross-section, and is arranged in a comb-teeth shape corresponding to the comb-teeth shape of the movable electrode 36. The fixed electrode 38 is located in a space between the movable electrodes 36. The fixed electrode 38 is fixed to the wiring 37 made of a part of the semiconductor layer 2b. Therefore, the movable electrode 36 is located to oppose to the fixed electrode 38. Further, the movable electrode 36 is movable relative to the fixed electrode 38. Thus, a comb-teeth electrode is constructed by the electrodes 36, 38 arranged in a comb-teeth shape, such that a capacitor is constructed between the electrodes 36, 38.

The wiring 33 of the detector 30, and the wiring 37 of the fixed part 32 are defined by the semiconductor layer 2b, and an electric potential is different between the wirings 33, 37. The wirings 33, 37 are electrically separated by an insulator 39 such as SiO$_2$ buried in a trench passing through the semiconductor layer 2b to the sacrifice layer 2c.

The insulation layer 4 located under the support board 2a is removed in an area of the detector 30. Therefore, the detector 30 floats relative to the second board 3. That is, the detector 30 is separated from the second board 3.

The driving portion 40 drives the detector 30 in a driving direction approximately perpendicular to a moving direction of the movable electrode 36. The driving direction corresponds to the X-axis direction, and the moving direction of the movable electrode 36 corresponds to the Y-axis direction. The driving portion 40 is arranged to surround the detector 30. The driving portion 40 includes a beam 41, a movable electrode 42 and a fixed electrode 43.

The beam 41 supports the detector 30 in a manner that the detector 30 floats relative to the second board 3. Due to the beam 41, the detector 30 is able to oscillate in the drive direction corresponding to the X-axis direction. The beam 41 has a U-shape, and the U-shape has a pair of parallel parts parallel to each other. The parallel part is distorted in a direction approximately parallel to a longitudinal direction of the parallel, part. The longitudinal direction of the parallel part is parallel to the Y-axis direction. The detector 30 is supported by four of the beams 41, for example.

A plurality of the movable electrodes 42 is arranged in a periphery of the support board 2a constructing the detector 30. Specifically, the movable electrode 42 protrudes from the wiring 37 in a direction approximately opposite from the extending direction of the fixed electrode 38. The movable electrode 42 corresponds to a comb-teeth projection protruding toward an inner periphery of the periphery portion 50.

The fixed electrode 43 is arranged in the periphery portion 50 so as to oppose to the movable electrode 42. The fixed electrode 43 and the periphery portion 50 are electrically separated from each other by an insulator 44 such as SiO$_2$ buried in a trench passing through the semiconductor layer 2b to the sacrifice layer 2c. Further, the fixed electrode 43 has a comb-teeth projection corresponding to the movable electrode 42.

A predetermined potential is supplied to the detector 30 by the periphery portion 50. The periphery portion 50 is arranged to surround the detector 30, and is distanced from the detector 30. Specifically, a part of the periphery portion 50 is electrically connected to the wiring 33 of the detector 30 through the beam 41 of the driving portion 40. Further another part of the periphery portion 50 is electrically connected to the wiring 37 of the detector 30 through the beam 41.

Therefore, the movable electrode 36 of the detector 30 is electrically connected to outside through the weight 35, the beam 34, the wiring 33, the beam 41 and the periphery portion 50. Further, the fixed electrode 38 of the detector 30 is electrically connected to outside through the wiring 37, the beam 41 and the periphery portion 50.

The cap 10, 20 prevents an intrusion of water or foreign object into a structure defined in the substrate 1. Due to the cap 10, 20, the detector 30 and the driving portion 40 are separated from each other in the substrate 1.

The first cap 10 air-tightly seals a first space 11 in which the detector 30 is arranged. The first cap 10 is fixed on a face of the semiconductor layer 2b so as to cover the detector 30.

The first cap 10 has a recess 12 to oppose to the movable part 31 and the fixed electrode 38. When the cap 10 is fixed to the semiconductor layer 2b, the movable part 31 and the fixed electrode 38 are restricted from contacting with the cap 10, due to the recess 12.

The cap 10 is fixed on the semiconductor layer 2b so as to surround the detector 30. The cap 10 is fixed in an area of the wiring 33 of the detector 30, the wiring 37 of the fixed part 32, and the insulator 39. Thus, the cap 10 is distanced from the detector 30, and covers the wirings 33, 37 and the insulator 39. Therefore, the detector 30 is air-tightly sealed in the first space 11.

An inside of the space 11 is suitable for the detector 30. Specifically, the space 11 is filled with adequate amount of gas so as to have an atmospheric pressure, such that damping effect can be provided between the movable electrode 36 and the fixed electrode 38. If an impact is applied to the sensor, the movable electrode 36 and the fixed electrode 38 can be restricted from colliding with each other. Thus, the sensor can be restricted from having damage.

The space 11 is not limited to have one atmospheric pressure. Alternatively, the space 11 may have a pressure higher than the atmospheric pressure. In this case, the damping effect can be made higher. In contrast, the space 11 may have a pressure lower than the atmospheric pressure. The space 11 may have about 0.5 atm, for example. The damping effect can be obtained except for a case in which the space 11 has a vacuum state. The gas filled in the space 11 may be air, or inactive gas. Alternatively, liquid such as water or oil may be filled in the space 11.

An oscillator 13 is defined by integrating the detector 30 and the first cap 10. The oscillator 13 is supported by the periphery portion 50 through the beam 41 of the driving portion 40, and is driven to oscillate by the electrodes 42, 43.

The second cap 20 air-tightly seals the driving portion 40 in a second space 21. The second space 20 is separated from the first space 11. The cap 20 is fixed to the semiconductor layer 2b so as to surround a periphery of the driving portion 40. The cap 20 is distanced from the driving portion 40, and covers the driving portion 40. The periphery of the driving portion 40 corresponds to an area of the periphery portion 50, the fixed electrode 43 and the insulator 44.

The second cap 20 is fixed to the substrate 1 so as to have a distance from the first cap 10. The second cap 20 covers the first cap 10, and has a recess 22. The recess 22 is located to oppose to the first cap 10 and the driving portion 40. Thus, the second space 21 is a space defined by the first cap 10 and the second cap 20, and the driving portion 40 is arranged in the second space 21.

The periphery of the driving portion 40 may correspond to an area of the periphery portion 50 and the fixed electrode 43.

An inside of the second space 21 is suitable for the driving portion 40. Specifically, the space 21 has a vacuum state, such that the electrodes 42, 43 of the driving portion 40 do not receive a damping of air. Therefore, the movable electrode 42 can have a relatively large amplitude, if only a relatively small potential difference is provided between the electrodes 42, 43.

The cap 10, 20 is made of silicon, glass, metal or ceramic substrate, for example. The cap 10, 20 is directly bonded to a face of the substrate 1, or bonded to the face of the substrate 1 through metal.

Thus, the first space 11 accommodating the detector 30 and the second space 21 accommodating the driving portion 40 are completely separated from each other. Therefore, each of the detector 30 and the driving portion 40 can be located in its appropriate condition.

Gas is filled in the first space 11, and the second space 21 is vacuumed. That is, a pressure in the second space 21 is lower than that in the first space 11. Therefore, the damping of air is reduced in the second space 21 than in the first space 11, such that oscillation of the detector 30 is not affected by the driving portion 40 located in the second space 21.

An effect of the damping is higher in the first space 11 than in the second space 21. Therefore, if the sensor has an impact, the electrodes 36, 38 located in the first space 11 do not collide or stick with each other, due to the effect of the damping.

A method of producing the sensor will be described with reference to FIGS. 3A, 3B, 3C, 4A, 4B and 4C corresponding to cross-sections taken along line II-II of FIG. 1.

Figure 3A:
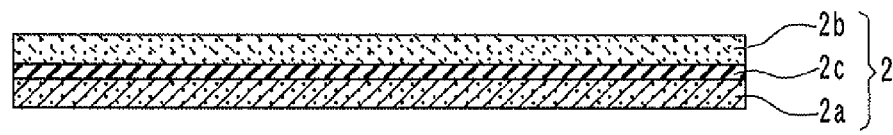
FIGS. 3A, 3B and 3C are schematic cross-sectional views illustrating a method of producing a semiconductor layer of the sensor.

As shown in FIG. 3A, the SOI substrate corresponding to the first board 2 is prepared. In the SOI substrate, the sacrifice layer 2c is layered on the support board 2a, and the semiconductor layer 2b is layered on the sacrifice layer 2c.

Figure 3B:
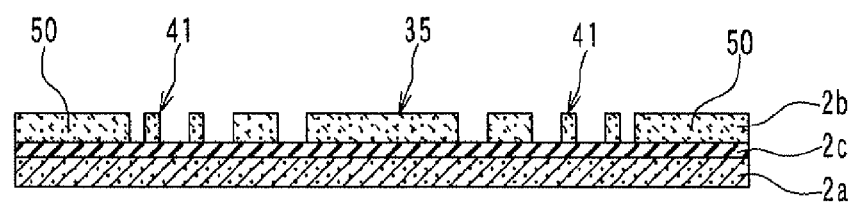

As shown in FIG. 3B, a pattern of the detector 30, the driving portion 40 and the periphery portion 50 is formed in the semiconductor layer 2b by using a photolithography etching.

Further, the trench passing through the semiconductor layer 2b is formed so as to insulate the wirings 33, 37 from each other, and to insulate the periphery portion 50 and the fixed electrode 43 from each other. The insulator 39, 44 is buried in the trench.

Figure 3C:
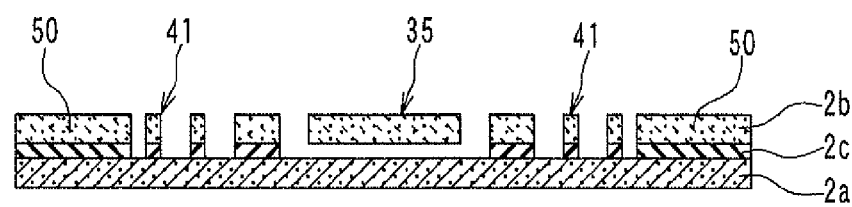

As shown in FIG. 3C, the sacrifice layer 2c located under the beam 34, the weight 35 and the movable electrode 36 of the movable part 31 is removed by using etching medium. The etching medium is hydrogen fluoride (HF) having a gas or liquid phase. Thus, the beam 34, the weight 35 and the movable electrode 36 are released from the support board 2a.

Figure 4A:
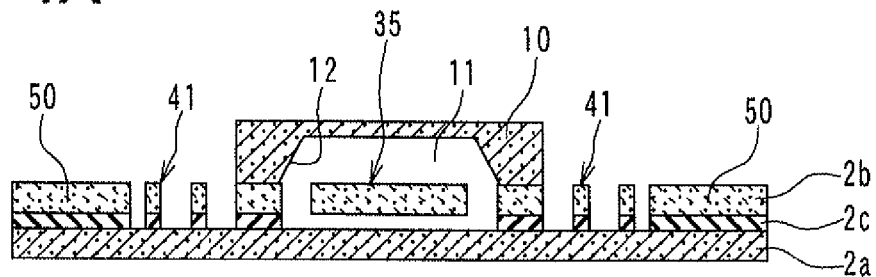
FIGS. 4A, 4B and 4C are schematic cross-sectional views illustrating a method of producing an oscillator of the sensor.

As shown in FIG. 4A, the first cap 10 having the recess 12 is prepared, and is directly bonded to the semiconductor layer 2b in an atmospheric pressure. The first cap 10 is bonded on the wiring 33, the wiring 37 and the insulator 39, such that the detector 30 is air-tightly sealed in the first space 11 having the atmospheric temperature.

Figure 4B:
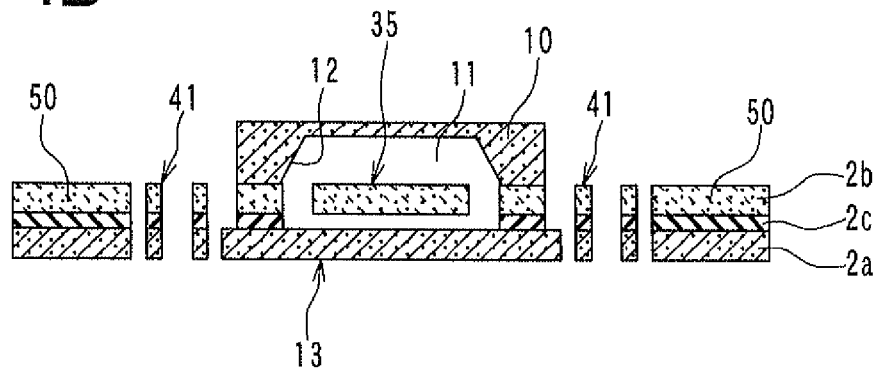

As shown in FIG. 4B, a part of the support board 2a is removed by using a photolithography etching, so as to define the periphery portion 50, the detector 30, the beam 41, the movable electrode 42 and the fixed electrode 43. A resist pattern is formed on a face of the support board 2a opposite from the sacrifice layer 2c, and the support board 2a is etched by using the resist pattern as a mask. Thus, the oscillator 13 constructed by the detector 30 and the first cap 10 is supported by four of the beams 41, and is oscillatable only in the X-axis direction.

Figure 4C:
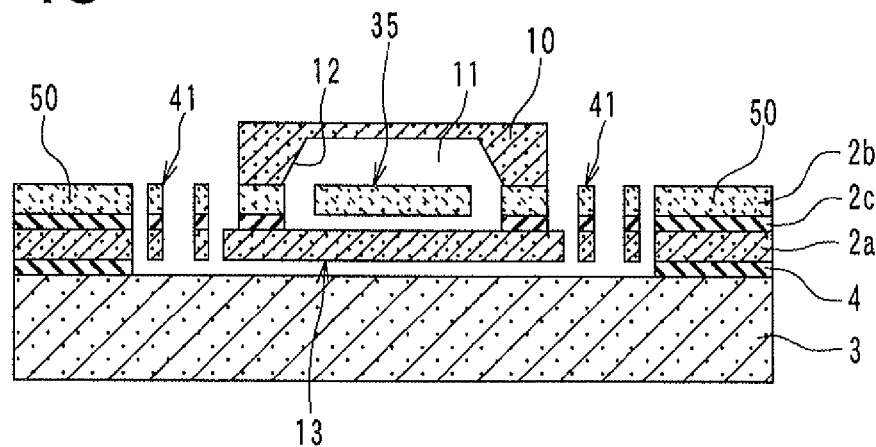

As shown in FIG. 4C, the insulation layer 4 is formed on a face of the support board 2a opposite from the sacrifice layer 2c at positions corresponding to the periphery portion 50 and the fixed electrode 43 using a chemical vapor deposition (CVD) method, for example. The second board 3 is bonded to the insulation layer 4.

The second cap 20 having the recess 22 is prepared, and is directly bonded to the semiconductor layer 2b so as to surround the driving portion 40 in a vacuum state. That is, the second cap 20 is bonded to the periphery portion 50, the fixed electrode 43 and the insulator 44, such that the driving portion 40 is air-tightly sealed in the second space 21. Thus, the sensor can be produced.

The above producing method is described for producing a single sensor. However, in a practical method, plural sensors are formed on a single wafer, and the wafer is separated into plural dices by cutting.

A method of detecting an angular speed by using the sensor will be descried. While the detector 30 is oscillated by the driving portion 40, an angular speed is generated. At this time, Coriolis force is applied to the weight 35 and the movable electrode 36, such that an interval between the electrodes 38, 36 is varied. The angular speed can be detected based on a capacitance variation of a capacitor between the electrodes 38, 36.

Specifically, when a potential difference is applied between the fixed electrode 43 and the oscillator 13, the oscillator 13 is displaced in the X-axis direction. When an alternate voltage having a predetermined frequency is applied to the fixed electrode 43, the oscillator 13 starts to oscillate at the predetermined frequency. The predetermined frequency may correspond to a natural frequency of the oscillator 13.

The oscillator 13 has the weight 35 supported by two of the beams 34, and the weight 35 is movable only in the Y-axis direction. While the oscillator 13 is oscillated, when an angular speed having a center corresponding to a Z-axis direction approximately perpendicular to the X-axis direction and the Y-axis direction is applied, Coriolis force is generated in the Y-axis direction. Due to the Coriolis force, the weight 35 is displaced in the Y-axis direction relative to the oscillator 13.

The displacement of the weight 35 is measured by detecting a capacitance variation generated between the electrodes 36, 38. The movable electrode 36 outputs an electric signal through the weight 35, the beam 34 and the wiring 33. The fixed electrode 38 outputs an electric signal through the wiring 37. The electric signal is converted into a voltage signal by a C/V converting circuit (not shown), for example. Thus, the angular speed can be measured.

According to the first embodiment, the detector 30 is air-tightly sealed in the first space 11 by the first cap 10, and the driving portion 40 is air-tightly sealed in the second space 21 by the second cap 20.

Therefore, the first space 11 accommodating the detector 30 and the second space 21 accommodating the driving portion 40 are completely separated from each other by the caps 10, 20. Thus, inside environments of the spaces 11, 21 can be made different from each other.

The first space 11 accommodating the detector 30 is set to have a pressure different from a vacuumed pressure, such that damping effect can be enhanced. Thus, the electrodes 36, 38 are prevented from colliding or sticking to each other.

The second space 21 accommodating the driving portion 40 is vacuumed, such that damping effect is not generated. Thus, the oscillator 13 can be easily oscillated. The first space 11 can be made suitable for the electrodes 36, 38, and the second space 21 can be made suitable for the driving portion 40.

Second Embodiment

The first cap 10 is bonded to the detector 30 so as to define the oscillator 13, but nothing is bonded to the beam 41 of the driving portion 40, in the first embodiment. In this case, the oscillator 13 is heavier than the beam 41, because the first cap 10 is bonded to the detector 30. A center of gravity of the oscillator 13 is located closer to the second cap 20, and a center of gravity of the beam 41 is located closer to the second board 3. Therefore, the oscillator 13 may be oscillated in a circle direction.

In a second embodiment, a position of center of gravity of an oscillator 13 is made to correspond to that of a beam 41 of a driving portion 40 in a direction approximately parallel to a semiconductor layer 2b.

Figure 5:
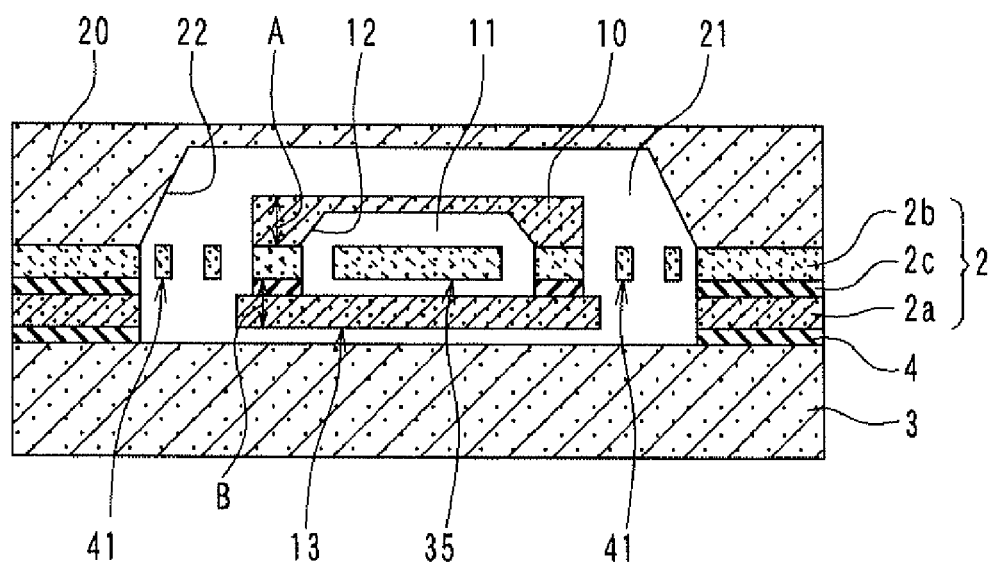
FIG. 5 is a schematic cross-sectional view illustrating an oscillating angular speed sensor according to a second embodiment.

As shown in FIG. 5, the beam 41 is constructed by only the semiconductor layer 2b, and supports the oscillator 13 to have a distance from the second board 3. That is, the sacrifice layer 2c, the support board 2a and the insulation layer 4 under the semiconductor layer 2b are removed in an area of the beam 41.

Thus, the semiconductor layer 2b constructing the beam 41 is separated from the second beam 3. Therefore, the center of gravity of the beam 41 is set only by the semiconductor layer 2b. Further, the oscillator 13 is supported by the beam 41 so as to be distanced from the second beam 3.

Further, a thickness of the thickest part of the first cap 10 is approximately equal to a sum of thicknesses of the support board 2a and the sacrifice layer 2c. As shown in FIG. 5, when the thickest part of the first cap 10 has a thickness of A, and when the support board 2a and the sacrifice layer 2c have a thickness sum of B, a relationship of A=B is defined.

According to the second embodiment, the position of the center of gravity of the oscillator 13 is made to correspond to that of the beam 41 in a direction approximately parallel to the semiconductor layer 2b. Therefore, the oscillator 13 can be oscillated without a deviation generated by a deviation of the center of gravity between the oscillator 13 and the beam 41.

Third Embodiment

Figure 6:
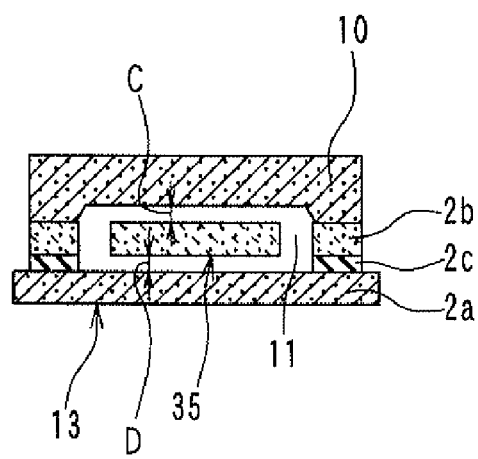
FIG. 6 is a schematic cross-sectional view illustrating an oscillator of an oscillating angular speed sensor according to a third embodiment.

As shown in FIG. 6, a distance between a semiconductor layer 2b and a first cap 10 is set approximately equal to that between a support board 2a and the semiconductor layer 2b, in a third embodiment.

The semiconductor layer 2b constructs the beam 34, the weight 35 and the movable electrode 36, which are separated from the support board 2a. When a face of the semiconductor layer 2b and a face of the first cap 10 opposing to the beam 34, for example, are distanced from each other by a distance of C, and when the support board 2a and the beam 34, for example, are distanced from each other by a distance of D, a relationship of C=D is defined.

According to the third embodiment, the semiconductor layer 2b can have the same damping effect between a face opposing to the first cap 10 and a face opposing to the support board 2a. Therefore, unnecessary oscillation of the weight 35 can be reduced in the Z-axis direction.

Fourth Embodiment

In the above embodiments, the driving portion 40 includes the beam 41, the movable electrode 42 and the fixed electrode 43, and the oscillator 13 is oscillated by applying alternate voltage to the fixed electrode 43.

In a fourth embodiment, an oscillator 13 is electromagnetically driven by using a first cap 10 and a second cap 20 covering the first cap 10.

Figure 7:
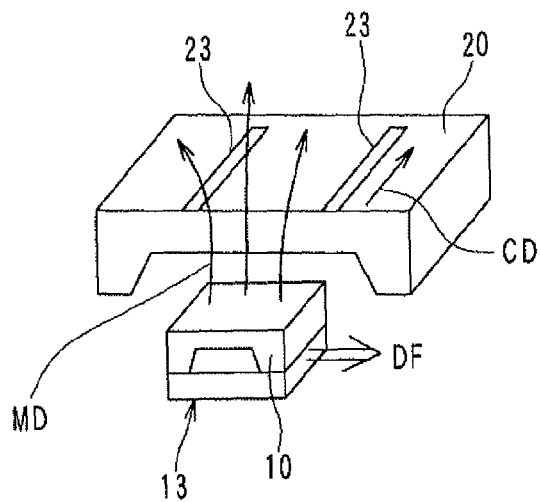
FIG. 7 is a schematic perspective view illustrating an oscillating angular speed sensor according to a fourth embodiment.

As shown in FIG. 7, the second cap 20 is fixed on a substrate 1 so as to cover the first cap 10 with a predetermined interval.

A part of the first cap 10 is made of a magnetic member to generate a magnetic field approximately perpendicular to the substrate 1. Alternatively, all of the first cap 10 may be made of the magnetic member.

As shown in FIG. 7, the second cap 20 has a wiring 23 extending parallel to a moving direction of the movable electrode 36. The wiring 23 is arranged on a face of the second cap 20 opposite from the first cap 10, and is electrically connected to outside through a pad (not shown). The wiring 23 is made of aluminum, for example.

A driving portion 40 of the fourth embodiment is constructed by the magnetic member of the first cap 10, and the wiring 23 of the second cap 20.

As shown in FIG. 7, when a current flows in the wiring 23 in a current direction CD, and when the electric field is applied to the wiring 23 in a magnetic field direction MD, Lorenz force is generated to the wiring 23 in a driving force direction DF.

Therefore, when alternate current is made to flow in the wiring 23, Lorenz force having a predetermined frequency is generated to the oscillator 13. Accordingly, the detector 30 is oscillated in the driving force direction DF, due to the Lorenz force.

According to the fourth embodiment, the oscillator 13 can be driven by using a structure having the second cap 20 and the first cap 10 covered by the second cap 20. Further, in this case, the movable electrode 42 and the fixed electrode 43 of the driving portion 40 can be made unnecessary, because the driving portion 40 is constructed by the magnetic member of the first cap 10, and the wiring 23 of the second cap 20.

Fifth Embodiment

A part of the fourth embodiment is modified in a fifth embodiment.

Figure 8:
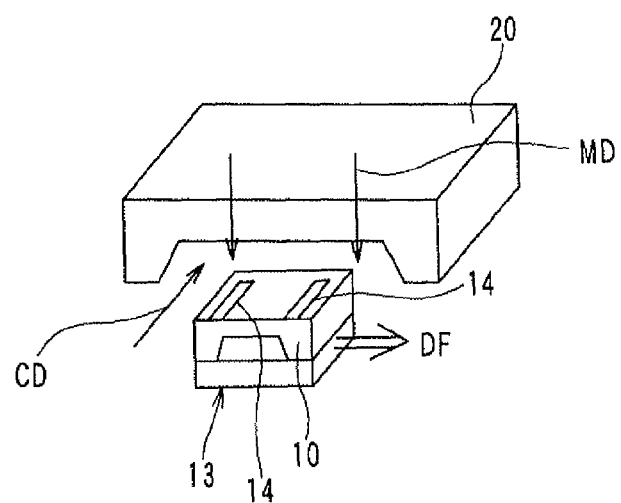
FIG. 8 is a schematic perspective view illustrating an oscillating angular speed sensor according to a fifth embodiment.

As shown in FIG. 8, the first cap 10 has a wiring 14 extending parallel to a moving direction of the movable electrode 36. The wiring 14 is arranged on a face of the first cap 10 opposing to the second cap 20, and is electrically connected to outside through a path (not shown). The wiring 14 is made of aluminum, for example.

A part of the second cap 20 is made of a magnetic member to generate a magnetic field approximately perpendicular to the substrate 1 in a magnetic field direction MD. Alternatively, all of the second cap 20 may be made of the magnetic member. A direction of the magnetic field is parallel to a direction of layering the caps 10, 20.

The driving portion 40 includes the wiring 14 of the first cap 10 and the magnetic member of the second cap 20.

According to the fifth embodiment, the wiring 14 is arranged in the first cap 10, and the second 20 is made of the magnetic member. Similarly to the fourth embodiment, the detector 30 can be oscillated in a driving force direction DF, due to Lorenz force generated in the wiring 14, when a current flows in the wiring 14 in a current direction CD.

Other Embodiment

The angular speed sensor is typically used in a form of a pair of the sensors having phases opposite from each other. In this case, the second cap 20 may have a single recess 22, and two of the oscillators 13 may be arranged in the second space 21 defined by the single recess 22. Alternatively, the second cap 20 may have two of the recesses 22, and two of the oscillators 13 may be arranged in two of the second spaces 21 defined by two of the recesses 22, respectively.

Figure 9:
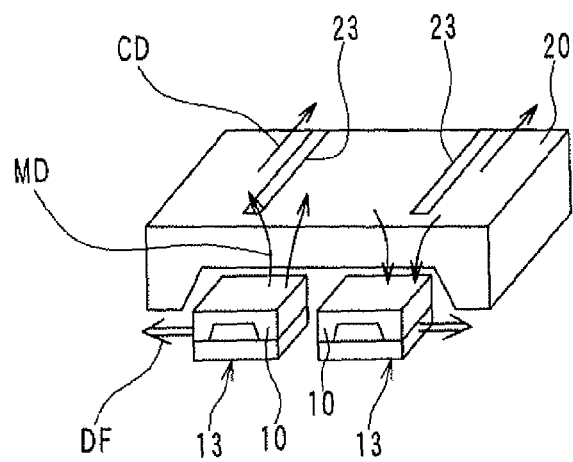
FIG. 9 is a schematic perspective view illustrating an oscillating angular speed sensor according to other embodiment.

In these cases, the driving portion 40 may have a construction similar to the fourth embodiment. As shown in FIG. 9, the magnetic field directions MD of the first caps 10 constructing the oscillators 13 are set to have phases opposite from each other. Therefore, when alternate current having the same current direction CD is made to flow in the wirings 23, the oscillator 13 can be driven in the opposite driving force directions DF. In a case that the driving portion 40 has a construction similar to the fifth embodiment, the current directions CD of the wirings 14 of the oscillators 13 are made opposite from each other.

In the above embodiments, the periphery portion 50 and the detector 30 are separated by a predetermined space of the semiconductor layer 2b. Alternatively, the oscillator 13 may have a clearance defined by only a movable range of the oscillator 13. In this case, a size of the second space 21 can be reduced, such that the sensor can be easily produced. Further, leakage can be restricted from being generated, such that a reliability of the sensor can be increased.

In the above embodiments, the driving portion 40 is located to surround the detector 30. Alternatively, the detector 30 may be located to surround the driving portion 40. In this case, the first space 11 accommodating the detector 30 and the second space 21 accommodating the driving portion 40 can be separated from each other, similarly.

When the detector 30 is located to surround the driving portion 40, a separating portion is fixed to the substrate 1 so as to be distanced from the detector 30 and the driving portion 40. The separating portion separates the first space 11 accommodating the detector 30 and the second space 21 accommodating the driving portion 40. That is, the separating portion covers the driving portion 40 and is separated from the driving portion 40.

In this case, the first space 11 accommodating the detector 30 and the second space 21 accommodating the driving portion 40 can be completely separated from each other, only due to the separation portion. For example, the first space 11 can have an atmospheric pressure so as to provide a damping effect for the electrodes 36, 38 of the detector 30, and the second space 21 closed by the separating portion is vacuumed so as not to provide the damping effect for the driving portion 40. In this case, the second cap 20 can be used as the separating portion.

When the driving portion 40 is located to surround the detector 30, the detector 30 can be covered by the separating portion. In this case, the first cap 10 is used as the separating portion, and the second cap 20 is unnecessary. The first space 11 is sealed by the first cap 10 corresponding to the separating portion, and the second space 21 accommodating the driving portion 40 is located under an atmospheric pressure. In this case, when the first space 11 is made to have a pressure higher than one atmospheric pressure, the damping effect can be increased in the first space 11.

When the driving portion 40 is covered by the single separating portion, the driving portion 40 can be located in the second space 21 different from the first space 11 accommodating the detector 30. Thus, environments of the spaces 11, 21 can be made different from each other.

The environments of the spaces 11, 21 can be made different from each other due to the single separating portion based on a condition of locations of the detector 30 and the driving portion 40.

In the above embodiments, the first board 2 is prepared, and the detector 30 and the driving portion 40 are formed in the first board 2. Thereafter, the insulation layer 4 is formed in the first board 2, and the second board 3 is bonded to the first board 2. Alternatively, the substrate 1 is prepared, and the detector 30 and the driving portion 40 are formed in the substrate 1.

Such changes and modifications are to be understood as being within the scope of the present invention as defined by the appended claims.

What is claimed is:

1. An oscillating angular speed sensor comprising:
   a detector arranged on a face of a substrate, the detector having
      a detection fixed electrode supported by a part of the substrate,
      a detection movable electrode to oppose to the detection fixed electrode so as to be movable relative to the detection fixed electrode in a movable direction, and
      a detection beam that supports the detection movable electrode,
   a driving portion arranged on the face of the substrate, the driving portion driving the detector to oscillate in a drive direction approximately perpendicular to the movable direction, the driving portion including a driving movable electrode, a driving fixed electrode and a driving beam; and
   a separating portion fixed on the face of the substrate so as to be distanced from the detector and the driving portion, wherein
      the detection movable electrode is displaced by Coriolis force applied to the detector, when an angular speed is generated while the detector is oscillated, such that the angular speed is detected based on a capacitance variation generated in accordance with a variation of an interval between the detection movable electrode and the detection fixed electrode, and
      the separating portion is configured to separate a first space accommodating the detector and a second space accommodating the driving portion, the second space having a pressure lower than a pressure of the first space.

2. The oscillating angular speed sensor according to claim 1, wherein
   the detector is located to surround the driving portion, the separating portion covers the driving portion, and
the separating portion is fixed on the face of the substrate so as to be distanced from the driving portion.

3. The oscillating angular speed sensor according to claim 1, wherein
the driving portion is located to surround the detector,
the separating portion is distanced from the detector, and
the separating portion is fixed on the face of the substrate so as to cover the detector.

4. An oscillating angular speed sensor comprising:
a detector arranged on a face of a substrate, the detector having
a detection fixed electrode supported by a part of the substrate,
a detection movable electrode to oppose to the detection fixed electrode so as to be movable relative to the detection fixed electrode in a movable direction, and
a detection beam that supports the detection movable electrode,
a driving portion arranged on the face of the substrate, the driving portion driving the detector to oscillate in a drive direction approximately perpendicular to the movable direction, the driving portion including a driving movable electrode, a driving fixed electrode and a driving beam;
a first cap fixed on the face of the substrate so as to surround the detector; and
a second cap fixed on the face of the substrate so as to surround the driving portion, wherein
the first cap covers the detector, and is distanced from the detector, such that the detector is sealed in a first space by the first cap,
the second cap covers the driving portion, and is distanced from the driving portion, such that the driving portion is sealed in a second space by the second cap,
the first space and the second space are separated from each other,
the detection movable electrode is displaced by Coriolis force applied to the detector, when an angular speed is generated while the detector is oscillated, such that the angular speed is detected based on a capacitance variation generated in accordance with a variation of an interval between the detection movable electrode and the detection fixed electrode, and
the second space has a pressure lower than a pressure of the first space.

5. An oscillating angular speed sensor comprising:
a detector arranged on a face of a substrate, the detector having
a detection fixed electrode supported by a part of the substrate,
a detection movable electrode to oppose to the detection fixed electrode so as to be movable relative to the detection fixed electrode in a movable direction, and
a detection beam that supports the detection movable electrode,
a driving portion arranged on the face of the substrate, the driving portion driving the detector to oscillate in a drive direction approximately perpendicular to the movable direction, the driving portion including a driving movable electrode, a driving fixed electrode and a driving beam;
a first cap fixed on the face of the substrate so as to surround the detector; and
a second cap fixed on the substrate so as to cover the first cap and to be distanced from the first cap, wherein
the first cap covers the detector, and is distanced from the detector, such that the detector is sealed in a first space by the first cap,
a second space is defined between the first cap and the second cap,
the first space and the second space are separated from each other,
the detection movable electrode is displaced by Coriolis force applied to the detector, when an angular speed is generated while the detector is oscillated, such that the angular speed is detected based on a capacitance variation generated in accordance with a variation of an interval between the detection movable electrode and the detection fixed electrode,
the second space has a pressure lower than a pressure of the first space,
the first cap has a wiring extending approximately parallel to the movable direction of the detection movable electrode,
a part of the second cap is made of a magnetic member to generate a magnetic field approximately perpendicular to the face of the substrate, the driving portion is made of the wiring of the first cap and the magnetic member of the second cap, and
the detector is oscillated in the drive direction by Lorenz force generated in the wiring, when a current flows in the wiring, and when the magnetic field is applied to the wiring.

6. An oscillating angular speed sensor comprising:
a detector arranged on a face of a substrate, the detector having
a detection fixed electrode supported by a part of the substrate,
a detection movable electrode to oppose to the detection fixed electrode so as to be movable relative to the detection fixed electrode in a movable direction, and
a detection beam that supports the detection movable electrode,
a driving portion arranged on the face of the substrate, the driving portion driving the detector to oscillate in a drive direction approximately perpendicular to the movable direction, the driving portion including a driving movable electrode, a driving fixed electrode and a driving beam;
a first cap fixed on the face of the substrate so as to surround the detector; and
a second cap fixed on the substrate so as to cover the first cap and to be distanced from the first cap, wherein
the first cap covers the detector, and is distanced from the detector, such that the detector is sealed in a first space by the first cap,
a second space is defined between the first cap and the second cap,
the first space and the second space are separated from each other,
the detection movable electrode is displaced by Coriolis force applied to the detector, when an angular speed is generated while the detector is oscillated, such that the angular speed is detected based on a capacitance variation generated in accordance with a variation of an interval between the detection movable electrode and the detection fixed electrode,
the second space has a pressure lower than a pressure of the first space,
a part of the first cap is made of a magnetic member to generate a magnetic field approximately perpendicular to the face of the substrate, the second cap has a wiring extending approximately parallel to the movable direction of the detection movable electrode, the driving portion is made of the magnetic member of the first cap and the wiring of the second cap, and the detector is oscillated in the drive direction by Lorenz force generated in the wiring, when a current flows in the wiring, and when the magnetic field is applied to the wiring.

7. The oscillating angular speed sensor according to claim 4, wherein the substrate includes a first board, a second board, and an insulation layer layered between the first board and the second board, the detector and the driving portion are constructed by the first board, and the first cap and the second cap are fixed on a face of the first board.

8. The oscillating angular speed sensor according to claim 7, wherein the first board includes a support board, a semiconductor layer, and a sacrifice layer layered between the support board and the semiconductor layer, the detection fixed electrode and the detection movable electrode are constructed by the semiconductor layer, and the first cap and the second cap are fixed on a face of the semiconductor layer opposite from the sacrifice layer.

9. The oscillating angular speed sensor according to claim 8, wherein the first cap and the detector define an oscillator, the driving portion is located to surround the oscillator, the driving portion has the driving beam connected to the oscillator, the driving beam is constructed by only the semiconductor layer of the first board, such that the sacrifice layer, the support board and the insulation layer are eliminated in an area of the driving beam, the driving beam supports the oscillator to be separated from the second board, the first cap has a thickest part having a first thickness, the first thickness is approximately equal to a sum of thicknesses of the support board and the sacrifice layer, and the oscillator and the driving beam have center of gravity located in the same face approximately parallel to the face of the semiconductor layer.

10. The oscillating angular speed sensor according to claim 8, wherein the face of the semiconductor layer and a face of the first cap opposing to the semiconductor layer are separated from each other by a first distance, and the first distance is approximately equal to a second distance defined between the support board and the detection movable electrode.

* * * * *